United States Patent [19]
Shachar et al.

[11] Patent Number: 5,764,736
[45] Date of Patent: Jun. 9, 1998

[54] METHOD FOR SWITCHING BETWEEN A DATA COMMUNICATION SESSION AND A VOICE COMMUNICATION SESSION

[75] Inventors: Yuval Shachar, Herzlia; Chaim Bendelac, Kfar Saba; Reuven Marko, Natanya, all of Israel

[73] Assignee: National Semiconductor Corporation, Santa Clara, Calif.

[21] Appl. No.: 504,934

[22] Filed: Jul. 20, 1995

[51] Int. Cl.⁶ .................................................. H04M 11/00
[52] U.S. Cl. ............................. 379/93.09; 379/93.23; 395/349
[58] Field of Search ..................... 395/762, 806, 395/807, 335, 349, 357; 348/13, 14, 17; 379/90, 93, 96, 98, 90.01, 93.01, 93.05–93.07, 93.09, 93.17, 93.23, 93.24

[56] References Cited

U.S. PATENT DOCUMENTS

| | | | |
|---|---|---|---|
| 4,688,170 | 8/1987 | Waite et al. | 379/93 |
| 5,309,507 | 5/1994 | Hosaka et al. | 379/96 |
| 5,319,701 | 6/1994 | Hird et al. | |
| 5,325,423 | 6/1994 | Lewis | |
| 5,351,296 | 9/1994 | Sullivan | |
| 5,369,688 | 11/1994 | Tsukamoto et al. | |
| 5,374,952 | 12/1994 | Flohr | 348/15 |
| 5,428,608 | 6/1995 | Freeman et al. | 379/90 |
| 5,483,352 | 1/1996 | Fukuyama | 379/93 |

*Primary Examiner*—Curtis Kuntz
*Assistant Examiner*—Stephen W. Palan
*Attorney, Agent, or Firm*—Limbach & Limbach LLP

[57] ABSTRACT

Techniques are described for switching from a data session to a voice session, then back to the data session. A "primary" data connection is established between a user's terminal and a communications network, which provides the user terminal with a tag identifying a voice network address (typically of a service provider) to which a voice connection can be established. The user initiates a voice connection (session) with the service provider by selecting a displayed service object associated with the service tag. During the voice session, the data session is suspended. Upon completion of the voice session, the "primary" data session is resumed. In an embodiment of the invention, a "secondary" data connection can be established during the voice session using one or more physical network connections. Data communication during the secondary data connection is optionally "remotely" guided by the service provider, and may include a distinct address for resuming the primary data connection. Video connections are accommodated during the voice session.

22 Claims, 6 Drawing Sheets

METHOD FOR SWITCHING BETWEEN A DATA COMMUNICATION SESSION AND A VOICE COMMUNICATION SESSION

RELATED APPLICATION

U.S. Ser. No. 08/504,595 titled METHOD AND APPARATUS FOR DOWNLOADING AND INTERACTING WITH AN INTERACTIVE ELECTRONIC BUSINESS CARD (Attorney Docket No. 950188), the contents of which are hereby incorporated by reference.

TECHNICAL FIELD OF THE INVENTION

The invention relates to data communication networks and to voice communication networks, and more particularly to techniques for coordinated communication using a voice communication network and a data communication network.

BACKGROUND OF THE INVENTION

For nearly as long as there have been computers, there has been a need to exchange information between computers. One method for accomplishing this has been through the use of data communication networks. Data communication networks have been provided in a wide variety of different forms, for a variety of different purposes. For example, a corporation might employ a local-area network (LAN) to permit a number of computers at a particular site to exchange and/or share data. Each computer is provided with a LAN interface and communicates with the other computers over the LAN. LANs can be either wired or wireless. Some examples of LANs in common use today are token-ring networks, Ethernet networks, and spread-spectrum radio networks.

By way of further example, if the same corporation wished to link more widely separated computers or to cross-connect several LANs, a wide-area-network (WAN) might be employed. WAN's can also be wired or wireless, employing such diverse communication media as leased telephone lines, dedicated cable, satellite channels, microwave communications, and fiber-optics.

In recent years, other commercially-provided data communication network options have become available. On-line services provide dial-up communications with such commercial networks. Service providers charge a fee for the use of these commercial networks, for providing database services, for enabling access to other networks, and for providing communications between users of the networks. Electronic mail (E-Mail) facilities are often provided whereby a user of a data communications network can post a message for another user to be picked up at a later time. Compuserve (tm), Delphi (tm), America Online (tm), Prodigy (tm), and Genie (tm) are examples of such on-line service providers. Generally, the on-line services are accessed by using a modem to connect to the service provider over the public switched telephone network (PSTN). The PSTN is a network, too, but unlike the data communication networks the PSTN is designed primarily to support voice communication.

An emerging communications medium called Integrated Services Digital Network (ISDN) combines some of the characteristics of data and voice communications networks into a single connection. ISDN permits simultaneous voice and data communications over a single ISDN line by breaking ISDN communications into two "B" channels and one "D" channel. The "D" channel is intended primarily for signalling, while the two "B" channels, which operate at much higher data rates, are intended to carry digital voice and data communications information.

Among the larger and better known data communication networks is "Internet". Internet is a well known and widely used computer network of world-wide scope. Internet is governed by a set of standardized protocols and access procedures by which any Internet "node" (a computer connected to Internet to which a "node address" has been assigned and to/through which data communication may occur) can communicate with any other Internet node. Generally speaking, Internet users must have a computer and either direct or dial-up access to an Internet node in order to communicate via Internet. Many commercial enterprises and educational institutions, world-wide, are connected to Internet. At present, Internet has approximately 30 million users.

As commercial data communications networks have grown, numerous general-user features have been added to make them more attractive to a wider base of users. For example, most on-line services provide information databases for accessing news and financial reports, weather forecasts, on-line shopping services, directory services (e.g., user directories) and special-interest databases (e.g., music, arts, technical, scientific, literature, reference materials, etc.).

Over the last few years, several commercial data communications networks (perhaps most notably Internet), have been employing a "hypertext" interface that controls how documents look on a display screen, which allows the inclusion of graphics in the document file, and which defines the relationship of one selected part of a document to the same type of information in other documents accessible over the data communications network. These relationships between documents are commonly called "hyper-links". The user has the option, at any time, of activating a hyper-link to retrieve and/or view the related document, which may reside in any node on the communication network.

The relationship of documents to one another in the above-described manner is often described as a "world-wide-web". This "web" is developing in a manner which is geared to computer-based access by users who own a personal computer (PC). This makes use of the "web" intimidating and uninviting to those who are relatively less computer-literate. However, many non-users regard access to the information in the "web" as being highly desirable.

Expanding upon this general theme, a major problem with many data communication networks is that they are designed for computer users. Due to the cumbersome and complicated nature of many computers and communications interface devices, this usually means that the use of data communication networks requires computer-literacy. Because many potential data communication users who would otherwise find data communication network features to be useful could not be described as being computer-literate, these data-communication networks are often under-utilized.

In an attempt to cater to less computer-literate people, some manufacturers have integrated data communication features and voice communications into a more familiar telephone-like device. These devices, which are gradually coming into use, are commonly known as "screen phones", and can be distinguished from conventional telephones by the presence of a display screen, non-telephone function buttons, an integrated modem, enhanced calling capabilities, and a variety of other distinguishing features. Currently, screen phones are sold as part of a screen phone system which includes a central computer and proprietary operating software. At the present time, very few services are available for access by screen phones and, therefore, the cost of a screen phone cannot be justified by many prospective users. Accordingly, the installed base of screen phones is relatively small. The small installed base, in turn, limits vendors' interest in providing screen phone services.

One specific data-communication-related application with which the present invention can be described concerns an electronic form of business card. An invention involving the transmission, receipt, storage and use of electronic business cards is described in the above-mentioned related application, and such description is hereby incorporated by reference. Conventional, printed paper business cards are exchanged between parties who wish to contact one another at some future time. Typically, one party is a "vendor" (e.g., of goods or services) and the other party is a "user", or buyer, of the vendor's product. A typical business card contains the vendor's company name, a person's name (a "contact" person, usually the person who gives the user the business card) a brief description of the vendor's line of business, a telephone number where the contact person can be reached, a fax number, an E-Mail address on a communication network, etc.. Business cards are often sought and collected by users so that they can be utilized at some time in the future to reach the vendor when a need for the vendor's product or services arises. The vendor is usually interested in making its business cards widely available to users in order to make it easy for users to contact the vendor, to help promote the vendor's business, and as a form of advertising.

The following terms are used in the description that follows:

User—one who is interested in purchasing goods/services.
Access Provider—an entity who (that) provides access to a data communication network such as Internet. Such an entity can be an on-line service such as Compuserve, a phone company, or other direct access provider, such as Netcom.
Service Provider—a vendor of goods and/or services.

A variety of off-line software utilities have been designed to assist users in "computerizing" their business card files. Two examples of such software utilities are programs commonly known as "Card" (tm) and "ACT!" (tm). To make use of these software utilities, the user enters contact data into a database (e.g., name, company, phone number, fax number, etc.). Once entered, the software utilities can act as an auto-dialer to dial the stored phone numbers (fax or voice). These utilities do not allow for insertion of information as defined by the service provider, nor is there any mechanism for update of such information by the remote provider (e.g., due to a change of address or phone, or a change in products or services).

U.S. Pat. No. 5,305,195, entitled "INTERACTIVE ADVERTISING SYSTEM FOR ONLINE TERMINALS" describes an interactive system for displaying advertising information from a remote central computer to terminals capable of displaying full motion video. Using a touch-screen, the user selects the service or goods desired. When a selection is made, and while waiting for the system to respond, a video clip of an advertisement (commercial), such as up to 15 seconds in duration, is displayed. The content of the video commercial is sent from a remote computer and loaded onto the non-volatile memory, such as hard disk, of the terminal.

U.S. Pat. No. 5,339,392, entitled "APPARATUS AND METHOD FOR CREATION OF A USER DEFINABLE VIDEO DISPLAYED DOCUMENT SHOWING CHANGES IN REAL TIME DATA" describes displaying real-time variable data on a custom document at a user's location, e.g., for stock quotations and similar application. This patent describes apparatus (most likely a computer) which allows the user thereof to define the "look and feel" of the custom document. This document references data, local or remote, which changes in real time. The method explains how these changes are to be reflected, in real-time, in the customized document.

U.S. Pat. No. 5,379,340, entitled "TEXT COMMUNICATION SYSTEM", describes a communication system in which text is sent from one terminal to another, and an indication of reception by the remote terminal is generated to the sending terminal. This allows the sending terminal continuation of retransmission upon failure to receive by the receiving terminal. The system works unattended. The system also checks that the text is received unharmed.

One on-line access provider, namely Prodigy Interactive Personal Service, provides on-line services whereby a user dials in and then may navigate a variety of services by selecting from various icons representing those services on the user's computer display screen. These icons are updated at the access provider's discretion with no control from the user. In fact, the user traverses the icons displayed while on-line to reach the desired information or service. The icons displayed are controlled only by the access provider and the user has no control over which icons are displayed.

Evidently, there is a need for a technique whereby an online service provider can provide a user with a type of electronic business card which the user can make use of at a later time to facilitate contact with the service provider.

In a broader sense, there is a need to provide a user with the ability to switch between data and voice sessions, including video sessions. For example, it would be advantageous to allow switching between a data session on the Internet and a voice connection, perhaps even over the same line.

U.S. Pat. No. 5,319,701, entitled "METHOD AND APPARATUS FOR PERFORMING AN AUTOMATED COLLECT CALL", discloses the use of a fully automated attendant to respond to requests for placing a collect call. The entire session happens during the initial connection and is transferred by the host computer to the required mode only if the call is approved as a collect call. According to the technique disclosed in this patent, there is always an interaction between a host and the telephone station, negotiating the details of the transaction.

U.S. Pat. No. 5,325,423, entitled "INTERACTIVE MULTIMEDIA COMMUNICATION SYSTEM", discloses a technique whereby a user can interact with various transmission media. The communication can occur over a telephone network, and the user can employ a telephone keypad to direct the interaction, which occurs in real-time.

U.S. Pat. No. 5,351,296, entitled "FINANCIAL TRANSMISSION SYSTEM", discloses a technique for performing a secured financial transaction, transferring both data and voice on the same telephone line. In general, the technique involves sending data using dual-tone multifrequency (DTMF) signals, and a muting system is used to prevent the DTMF signals from being heard by the user over the telephone earpiece. In this manner, data and voice can be sent simultaneously.

U.S. Pat. No. 5,369,688, entitled "DATA COMMUNICATION APPARATUS WITH INTERRUPT COMPLETION DETECTING", discloses a technique for interrupting (temporarily holding) a telephone communication while a data transmission request is being serviced.

SUMMARY OF THE INVENTION

It is an object of the present invention to provide a technique for permitting automated exchange of vendor-related information over a communication network.

It is a further object of the present invention to provide a technique for establishing voice contact with a vendor over a voice communication network while engaged in a data communication session accessing information from the vendor.

It is a further object of the present invention to provide a technique for automated switching between data and voice communication connections.

It is a further object of the present invention to provide a technique for establishing simultaneous voice and data communications with a service provider.

It is a further object of the present invention to provide a technique for a service provider to remotely guide a data communication session on a user's data communications terminal while simultaneously communicating by voice with the user.

It is a further object of the present invention to provide a technique for receiving from a service provider a network address to which a data connection can be established upon completion of communication with the service provider.

According to an exemplary use of the invention, electronic business cards are received from vendors by users. The electronic business cards are data structures defining information commonly contained on conventional paper business cards, but providing for automatic access to voice, fax and/or E-Mail communication with the vendor. Unlike "contact manager" programs, the vendor information is received in its complete form (i.e., in the form of an electronic business card) and is stored within non-volatile memory of a communication terminal device. The communication terminal device may be a computer or a screen phone.

Tags defined within the electronic business card data structure define phone numbers, fax numbers, E-Mail network address, etc., by which a vendor can be contacted. The electronic business card can be displayed on a display screen of the communication terminal device. Each tag is associated with a display "object" on the display screen, e.g., a "button" or a highlighted text or graphical object. When the object is selected by a user using an input device of the communication terminal device, an action defined by the tag associated with the selected object is performed. For example, if the selected object is a button labeled "Call Service Desk" and the tag associated with the button is a phone number tag in which a phone number for a service desk at the vendor's location is defined, then the communication terminal device dials the phone number automatically and establishes voice communication (i.e., a phone call) to the vendor's service desk so that the user can converse with a person at the vendor's site.

An important aspect of the invention is the ability to manipulate voice and data connections between a data communication session and voice communication, such as with a service provider. The aforementioned exemplary use involving an electronic business card is intended not to be limiting of the broader uses of the present invention, which are described in greater detail hereinbelow.

According to the invention, a "primary" data connection is established between the communication terminal device and a data communication network. Within the communication terminal device, a service information tag identifying a voice network address (e.g., a phone number) is provided. A service object, e.g., an icon or descriptive text, is displayed on the display of the communication terminal device. A user selects the service object with the input device. Upon selection of the service object, a voice connection is made to the voice network address. Information related to the primary data connection is saved, and the primary data connection is suspended. Once voice communications using the voice connection are completed, the voice connection is terminated and the primary data connection may be resumed/re-established.

According to an aspect of the invention, if simultaneous voice and data communications capabilities are possible, a "secondary" data connection is established in conjunction with the voice connection. Preferably, such "paired" connections are both made to a single service provider.

According to another aspect of the invention, a data session using the secondary data connection is "remotely-guided" by the service provider to provide information on the display of the user's communication terminal device.

According to another aspect of the invention, the data and voice sessions can be accomplished either via a single voice and data-capable network, or via separate voice network and data networks (e.g., via telephone and Internet).

According to another aspect of the invention, the remotely-guided secondary data session is used to provide the communication terminal with a resumption network address. When the primary data connection is resumed/reestablished, it transfers immediately to the resumption network address.

According to another aspect of the invention, video communication can be provided in conjunction with the voice communication connection. In this case, the communication terminal device includes a video module (either integrated or separate) to permit video communication with a remote video station across a video communication network. The voice, video, and/or data connections can be established either via a single physical network or via separate networks.

According to another aspect of the invention, the service tag (which can be a combination of other tags) identifies communications capabilities of a service provider, such as whether simultaneous voice and data communications are possible and whether video communication is available with the service provider. Based upon the service provider's capabilities as identified by the service tag, and upon physical capabilities of the communications terminal device, simultaneous secondary and/or video connections are established with the service provider, in conjunction with the voice connection. If such simultaneous connections are not possible, either due to lack of service provider capability or capabilities of the communication terminal device, these simultaneous connections are simply not made.

Other objects, features and advantages of the present invention will become evident in light of the following description thereof.

BRIEF DESCRIPTION OF THE DRAWINGS

Reference will be made to preferred embodiments of the invention, examples of which are illustrated in the accompanying drawings. Although the invention will be described in the context of these preferred embodiments, it should be understood that such description is not intended to limit the spirit and scope of the invention to these particular embodiments.

DETAILED DESCRIPTION OF THE INVENTION

The present invention can be described in relation to navigating between information stored in the nodes of a data communication network and techniques for exchanging "electronic business cards". Electronic business cards are much like ordinary paper business cards in that they identify a vendor, a contact person, and various possible ways of making contact. However, unlike physical, paper business cards, the electronic business card exists as a hyper-linked data item on a computer storage medium. The exchange of electronic business cards over a data communication network requires that certain hardware capabilities and access procedures are in place. Further, electronic business cards permit automated access to information available from a vendor, and permit, for example, automated initiation of fax transmission and/or voice communications with the contact person.

Figure 1:
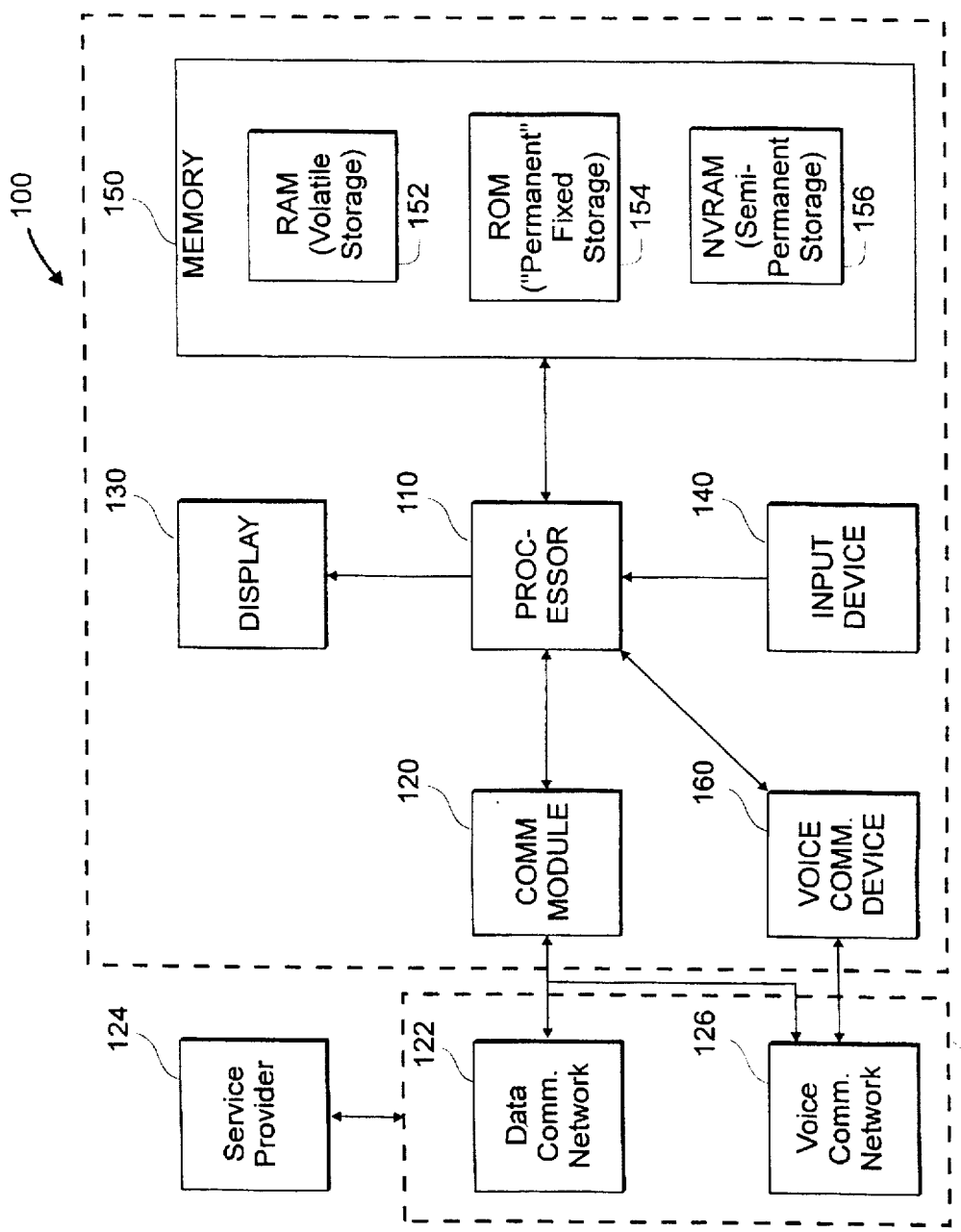
FIG. 1 is a block diagram of a data communications terminal device, according to the present invention.

FIG. 1 is a block diagram of a data communications terminal 100 having the capability of receiving, storing, and operating upon electronic business cards, according to the present invention. The terminal includes a processor 110, a communications (COMM) module 120, a display device 130, an input device 140, memory 150 and a voice communication (COMM.) device 160. The processor 110 receives user input and commands (e.g., keypad or keyboard button depressions, mouse clicks, etc.) from the input device 140, and produces displayable output on the display device 130 with which the user interacts. Preferably, the processor operates according to a GUI (Graphical User Interface) whereby graphic objects displayed on the display device 130 by the processor 110 can be selected and/or manipulated by the user with the input device 140. The input device 140 can include one or more from among multiple input peripheral devices, such as a keyboard, numeric keypad, mouse, touch pad, touch screen, joystick, etc. Any suitable input peripheral device for interacting with the processor 110 can be accommodated. Similarly, the display device 130 can be an LCD screen, a CRT (cathode ray tube) or any other suitable display peripheral device or combination of display peripheral devices and indicators. In the event that a GUI is employed, the display device 130 must have at least minimal graphical display capabilities, as dictated by specific needs of the GUI. (GUI software is well known to those of ordinary skill in the art and will not be further elaborated upon herein.)

According to an aspect of the invention, a GUI for the data communications terminal can be guided according to a hyper-text markup language, such as HTML (used in conjunction with Internet "Web" sessions), whereby a series of "markup" elements describe objects to be displayed and actions to be taken upon the selection of these objects by a user.

The communications module 120 interfaces the processor 110 to a communications network 128. Preferably, the communication network 128 has both voice and data communication capabilities. Logically, however, the voice and data communications capabilities can be separated into a data communication network 122 and a voice communication network 126. The data communication network permits access therethrough to one or more service providers 124. The voice communication network 126 provides telephone-like communication features whereby a voice (audible) conversation with another party (presumably human, but possibly an automated voice response system) can be established.

The voice communication device 160 can either be integrated into the terminal 100, or logically associated therewith. In the first case, the terminal 100 would integrate at least some of the features of a telephone, such as a dialing interface, a speaker, and a microphone. In the latter case, the voice communication device 160 could be provided as a separate telephone, for example, plugged into a bypass port of a modem.

By way of example, an ISDN connection can be used to provide both voice and data communications over a single network.

By way of further example, a dial-up connection to a data communication network operating in conjunction with a packet-voice capability can be used to provide voice and data communications. VOCALTEC is currently providing software for permitting packet voice conversations over Internet, using conventional computer sound cards and microphones for voice input and output. Two similarly equipped computers can be used to provide telephone-like conversations across Internet in this way.

By way of further example, a dial-up connection to a data communication network can be used in conjunction with a separate telephone line for voice communication to provide simultaneous voice and data communications.

By way of further example, a single dial-up connection can be used for connection to a data communication network, then switched over to normal telephone use as required.

Optionally, the terminal can be operated without voice capability, by omitting those features which are specific to voice communication.

The processor 110 accesses the memory 150 in order to accomplish its various tasks. The memory 150 includes volatile storage 152 such as random access memory (RAM) for storing data on a temporary basis, "permanent" fixed storage 154 such as read-only memory (ROM) for storing program information to be executed by the processor 110, and non-volatile (NV) or semi-permanent storage 136 (e.g., NVRAM, hard disk, or other non-volatile storage medium such as FLASH memory or Electrically Erasable Programmable ROM (EEPROM)) for storing data which may be updated. (Although the program storage is referred to as "permanent", it will readily be understood by those of ordinary skill in the art that program data can be stored on a computer disk, or in re-writable "FLASH" memory which can be updated. It is generally only important that the program information be stored in a manner which is readily accessible to the processor 110 on an as-needed basis).

The terminal 100 encompasses a wide variety of physical devices, including, but not limited to, computers and screen phones.

It is assumed, for purposes of this description, that the terminal 100 has a "browser" program associated with it. "Browser" programs are the instrumentality by which a user "navigates" information stored on a data communication network such as Internet. These browser programs recognize the formatting and link information stored with hyper-linked hypertext documents (described hereinabove) and generate appropriately formatted displays from data and formatting information contained in the document. Further, browser programs are capable of retrieving and storing/displaying hyper-linked documents when a hyper-link is activated by a user (usually by selecting a hyper-link object on a display screen). Those of ordinary skill in the art are familiar with browser programs and their capabilities. Accordingly, browser programs will not be further elaborated upon herein.

Figure 2:
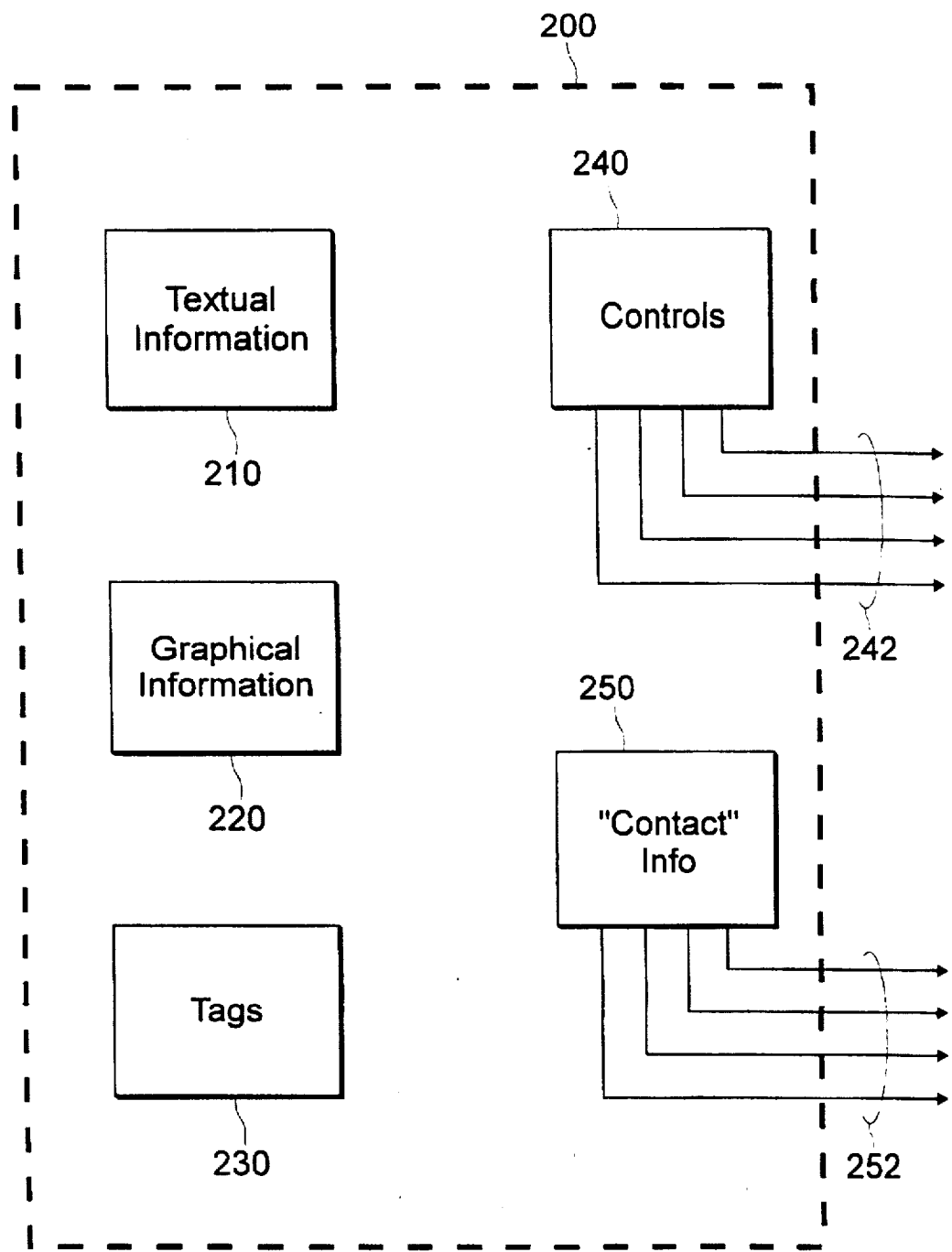
FIG. 2 is a data diagram showing data structures of an Electronic Business Card, according to the present invention.

FIG. 2 is a data diagram showing a set of data items which make up an electronic business card 200, according to the invention. Typically, an electronic business card identifies a vendor, a contact person, and information regarding how to communicate with the vendor and/or with the contact person. The electronic business card includes textual information 210, (e.g., a company name, an address, a contact person's name, a brief description of goods/services produced by a vendor, etc.), graphical information 220 such as a logo or animated sequence, a set of "tags" 230, such as "buttons" on the screen, which enable use of the electronic business card 200 to actuate certain actions (described in greater detail hereinbelow and in the related application), a set of hyper-linked controls 240 for which hyper-link connections 242 are defined, and "contact" information 250 for which a set of action links 252 are defined.

Tags 230 are generally associated with some kind of an action (e.g., dialing a phone, etc.) Some tags, such as the Logo tag and the Notes tag (see below), are associated with one or more items of graphical or textual information (e.g., 210, 220). These tags 230 include:

Logo tag: a graphical image reference which is associated with a document, (e.g. a "web" page); a series of images that can be referenced to create a motion-like appearance.

E-Mail Address Tag: a communication network address (e.g., node and user-name) to which information can be sent. This is typically the vendor's "mailbox" where the vendor receives communication.

Phone Tag(s): one or more phone numbers for voice communication with the vendor and/or contact person. Depending upon the nature of the communication network, a phone tag may identify a communication network address to which voice communication may be established, or a conventional telephone number.

Fax Number Tag(s): one or more fax numbers. This may be an E-Mail address, depending upon the nature of the communication network and the vendor's hardware facilities for receiving "fax" information.

Name/Address Tag: one or more tags identifying the name and address of a person or a business.

Note Tag: a tag followed by free form text which can be used to provide additional information.

Attributes associated with electronic business cards are:

Keywords: words that when matched in a search pattern will cause the electronic business card to appear when the user searches and uses one of those keywords.

Stamp: an electronic momentary indication (like a post office stamp) which will charge the entity (e.g. vendor) providing the electronic business card with royalties, transmission fees, etc.

Expire: an expiration date after which the electronic business card will be deleted from the nonvolatile memory of the apparatus, unless the user decides to retain that business card.

The nonvolatile storage 156 of the terminal 100 can be set up to include a number of different "directories" for electronic business cards. By way of example, a three-directory system is described below.

A first of three directories, called the "Quick Access Directory", holds electronic business cards of a select group of service providers (vendors). The Quick Access Directory is analogous to a list of frequently dialed numbers.

A second directory, called the "Private Directory" holds all of the electronic business cards collected and retained by the user.

A third directory, called the "Yellow Page Card Directory" includes many electronic business cards stored "locally" in non-volatile storage within the terminal. These can be stored in the terminal by a manufacturer as a sort of Yellow Pages (tm) wherein vendors can have their business cards made available to users.

Electronic business cards can include an "Expire Tag" defining an expiration date for the electronic business card. When viewed for the first time after this date, the processor (110), recognizing that the expiration date has passed, warns the user that this electronic business card is being displayed for the last time unless the user opts (via a selection) to retain the expired electronic business card. The user can opt to erase any or all non-permanently stored electronic business cards, at will.

Electronic business cards can be downloaded to the terminal (100) over the data communication network (122). This is accomplished through a suitable mechanism such as E-mail or file transfer protocols, automatically or at will. An electronic message containing the electronic business card, its various tags and attributes, is sent to the terminal 100 either autonomously (e.g., by a service provider (vendor), by the user accessing the service provider), or in response to an explicit user request (e.g., "Please send me your business card") and is stored in the terminal's non-volatile storage, (e.g., in the aforementioned Quick Access Directory or Private Directory). The electronic business card may include a Stamp Tag covering the handling fees of the access provider, royalties and other costs. A password may be employed by the user to ensure that only electronic business cards from specifically authorized service providers can be uploaded in this manner.

Effectively, an electronic (interactive) business card is a sort of hypertext document, as described hereinabove, with special features permitting special actions to be performed when certain displayed items are selected.

In general, when the electronic business card is displayed, information associated with the various tags is displayed on the display screen. For example, the vendor's name and address, E-Mail address, contact person's name, phone number(s), fax number(s) etc., are displayed on the display screen (e.g., 130). When the user selects one of the displayed "tag" items, an action is evoked.

For example, when the user indicates by selection of a phone number that a voice conversation is desired, the terminal 100 automatically dials the phone number and initiates a voice call via the voice communication device 160. If necessary (optionally), the connection to the data communication is terminated to make the voice call. (Terminating the data communication would only be required if simultaneous voice and data communication is not possible due to the communication network (128) configuration.) The steps necessary to switch between a data communication session and a voice session (call) are described in greater detail hereinbelow with respect to FIGS. 4a–4c.

The above-described technique of manipulating electronic business cards is provided primarily as an example of a communications technique which requires switching back and forth between a data communications session and a voice communications session based upon selections made either automatically or by a user. The present invention, however, is not limited in its application to manipulating electronic business cards.

According to the present invention, it is also possible to establish a video communication session (e.g., videophone) with a service provider in conjunction with a voice session when a phone number object is selected. In this case, a more general purpose "service tag" (not shown) is provided. The service tag can be implemented as a collection of separate tags or as a larger single tag. The service tag identifies communications capabilities of a service provider. For example, if a service provider has a service desk which can simultaneously communicate by voice, video and data, then the service tag (corresponding to a displayed object for selecting service desk communications) identifies the capabilities (voice/video/data) and network addresses by which communications connections to these capabilities can be established.

Figure 3:
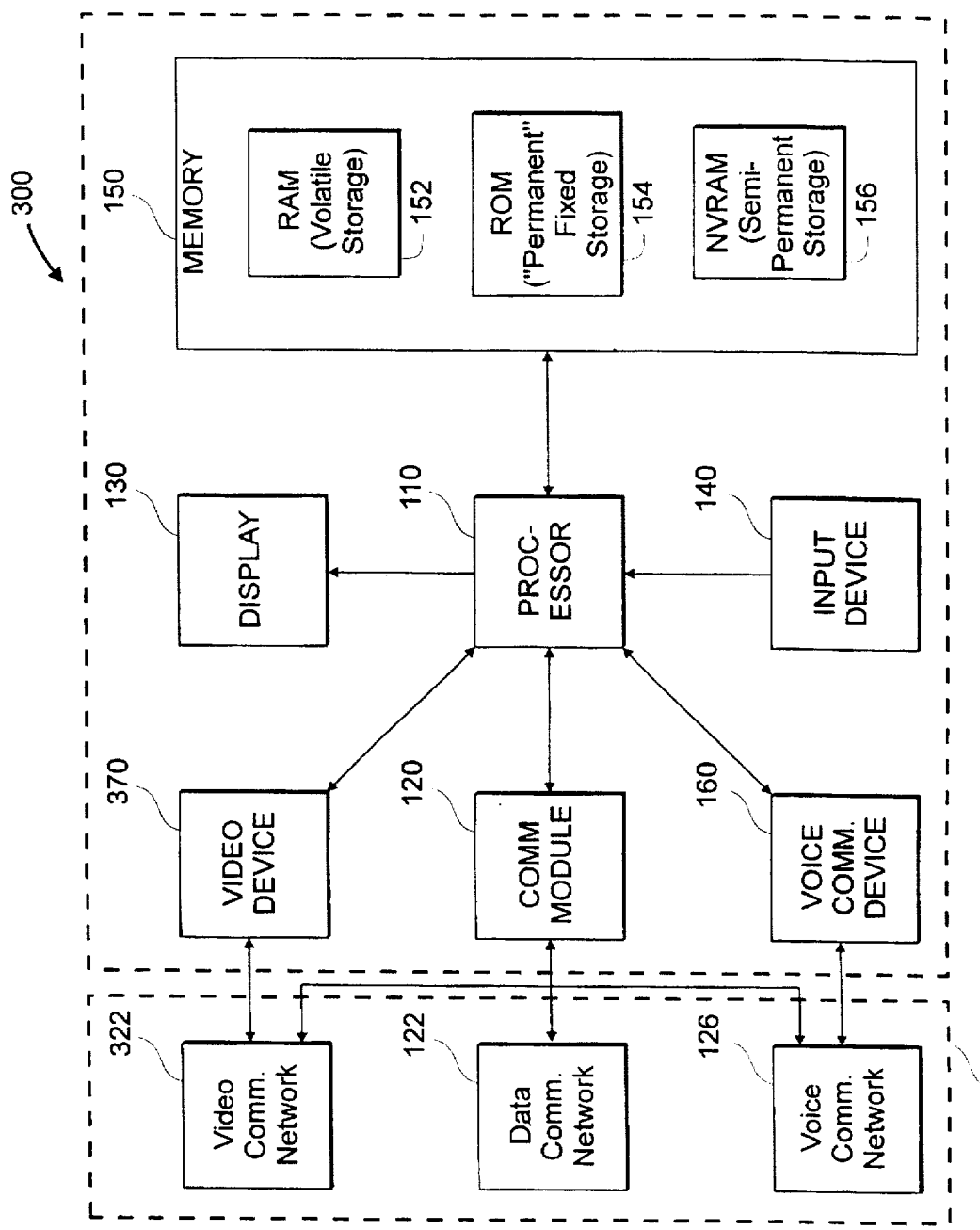
FIG. 3 is a block diagram of a data communications terminal device incorporating video communication capability, according to the present invention.

In order to provide for video communications, however, the communications terminal device (e.g., 100) must be configured (adapted) to provide video communication capability. FIG. 3 is a block diagram of such a communications terminal device 300.

The communication terminal device 300, like the communications terminal device 100, has the capability of receiving, storing, and operating upon electronic business cards, and includes a processor 110, a communications (COMM) module 120, a display device 130, an input device 140, memory 150 and a voice communication (COMM.) device 160.

Additionally, the terminal 300 is provided with a video device 370 which allows for video communications. The video device 370 can be either integrated within the communication terminal device 300 or separate and attached to it. Typically, the video device comprises hardware for communicating video signals with a video communication network 322, and displaying them, e.g., on the display 130 of the communication terminal device 300 or on a separate video display (not shown).

As with the voice communication network 126, the video communication network 322 can be separate from or common to the data communication network 122.

In attempting to establish automatic voice communications with a vendor (service provider) it is necessary to provide for disposition of the "current" data communication session. Since most data communication network connections are charged by connect time, it would be highly undesirable to leave a data communication session active, but unused, during a lengthy voice conversation. Further, it would be useful for the service provider to be able to cause the communication terminal device to display information of the service provider's choosing in assisting the user.

In order to accomplish these objectives, the present invention provides for switching between communication sessions when service provider communications are initiated according to information contained in a service tag.

The service tag can be provided by a service provider in conjunction with an electronic business card, as described hereinabove. The service tag is associated with a "service button" which is displayed on the communication terminal display screen. The service button can be a graphical object or a text object on the display. When the service button is selected by a user, then information in the service tag guides the disposition of subsequent communication connections. The tag includes related information such as the phone number to be called, related charges, if any, connection technology (voice, voice and data, video, etc.)

When the service button is selected, information related to the current data connection (primary data connection) is saved and the data connection is suspended (e.g., by ending the connection).

A voice connection is established according to a voice network number stored within the service tag. (This may be a phone number). If simultaneous secondary data and/or video communications are possible and desired by the user (e.g., by user indication) then corresponding secondary data and/or video connections are established according to network addresses therefor specified in the service tag.

When the voice connection is established, the user begins a voice session with the service provider. For example, the user could be prompted to pick up a telephone handset by a "ringing" sound. Alternatively, a speakerphone session could automatically be started upon successful establishment of the voice connection.

If a simultaneous secondary data connection is established, context information related to the primary data connection can be sent to the service provider to indicate to the service provider just exactly what was being viewed by the user when the voice connection was selected.

According to one aspect of the invention, the service provider establishes a remote data session with the user so that data selected by the service provider is displayed on the user's communication terminal device. In effect, the service provider remotely guides the data session.

Once the voice connection is terminated (user goes on hook, or service provider disconnects) the secondary data session (if any) is disconnected and the primary data session is resumed using the saved context information, unless terminated by the user.

Prior to disconnection, the service provider can send a resumption network address to the communication terminal device so that the primary data session resumes at a point specified by the resumption network address. In this way the service provider can automatically direct the user to information via the primary data connection when it is resumed.

Although the invention is described hereinabove primarily in terms of responding to "service tags" associated with electronic business cards, it is not intended that the present inventive techniques be limited to such applications. It is intended that the present invention be employed in conjunction with any suitable signalling technique, either automatic or manual, for requesting switching between a two different communication sessions.

Figure 4A:
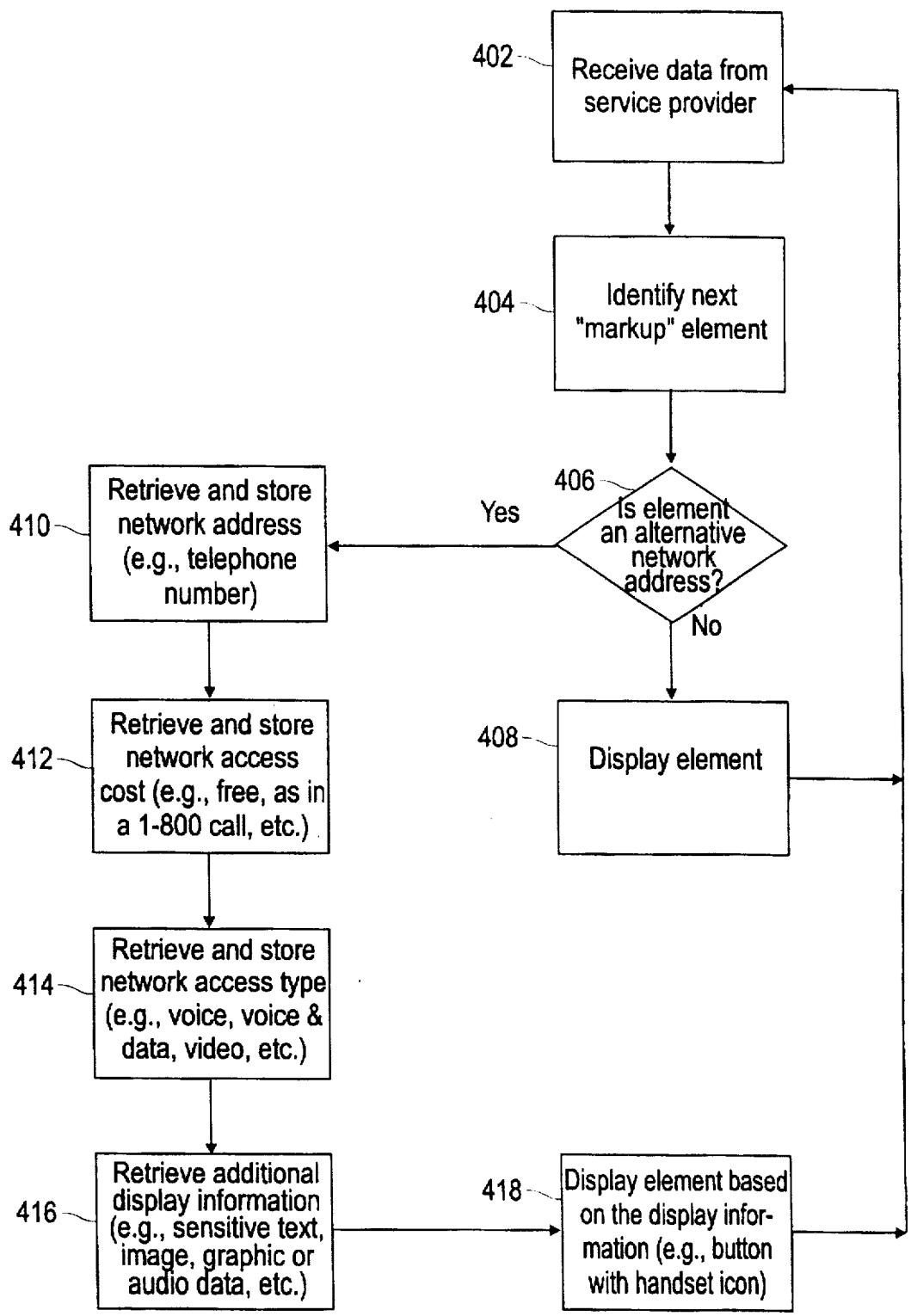
FIG. 4a is a flow chart showing steps taken in preparation for switching between a first communications session (e.g., data) and a second communications session (e.g., voice), according to the present invention.
Figure 4B:
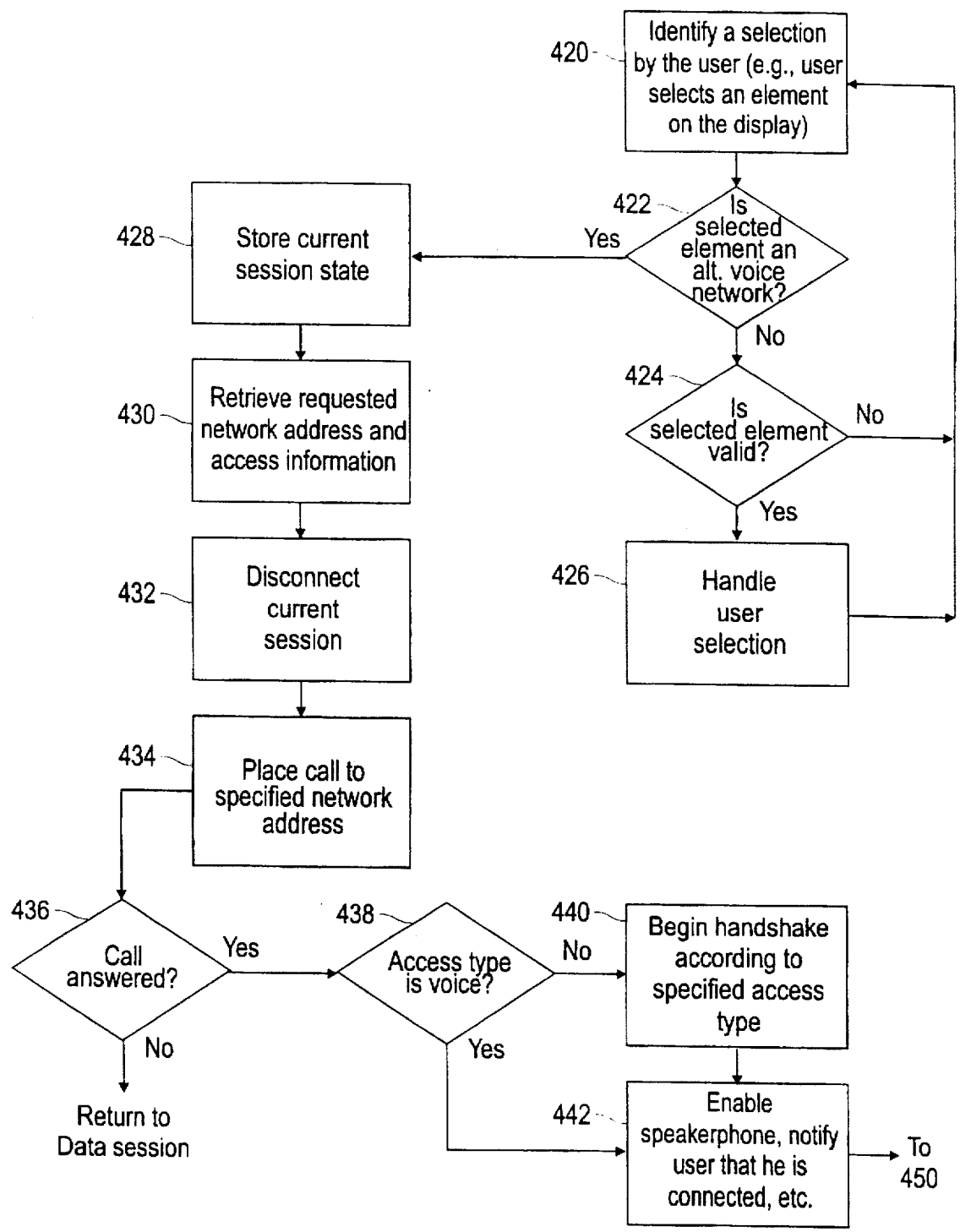
FIG. 4b is a flow chart showing steps taken in switching from a first communications session to a second communications session, according to the present invention.
Figure 4C:
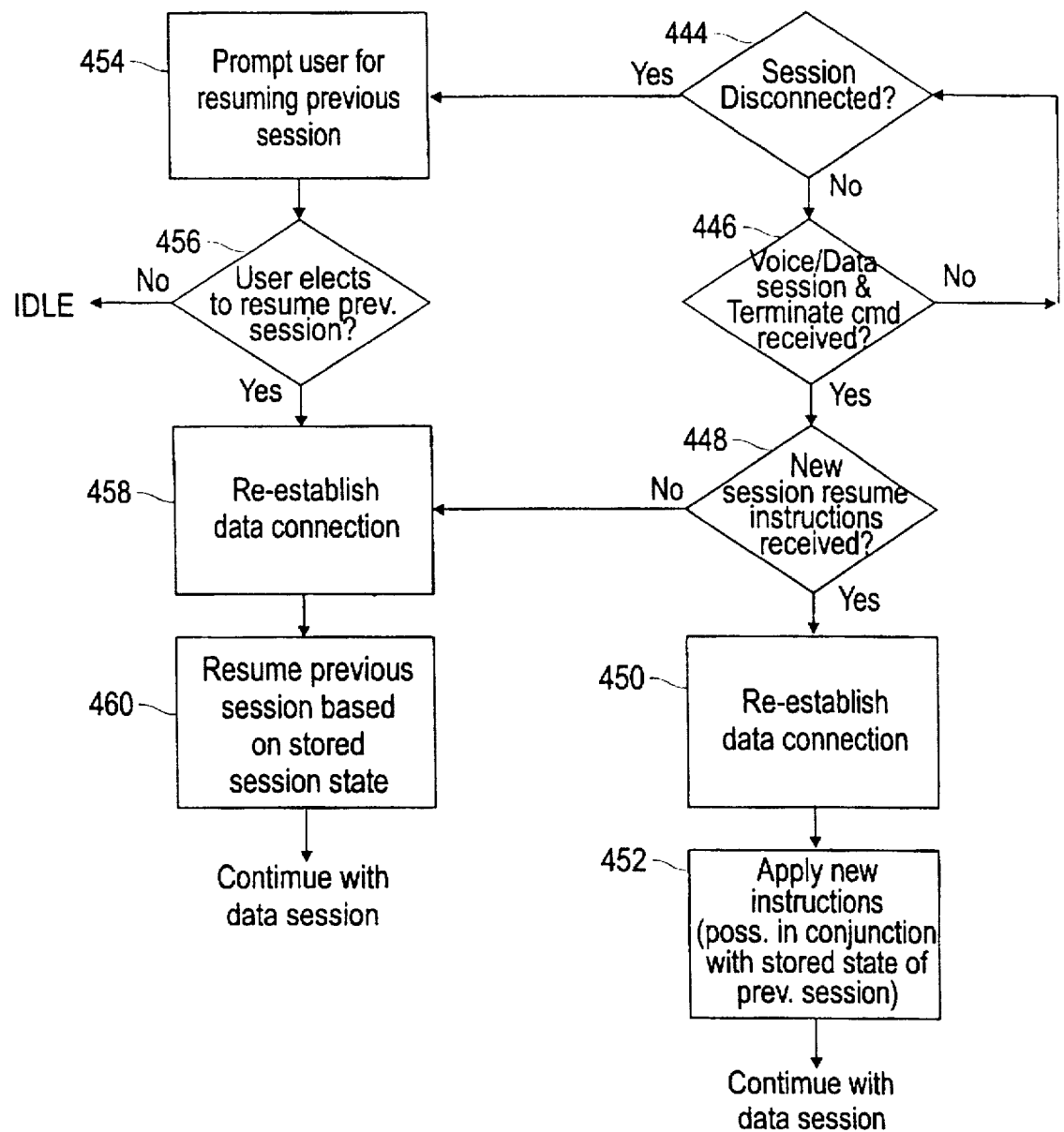
FIG. 4c is a flow chart showing steps taken in terminating a second communications session and resuming a first communications session, according to the present invention.

FIGS. 4a, 4b, and 4c are flow charts showing the steps required to switch back and forth between two different types of communication (e.g., between data and voice, data and video, etc.). These flow charts assume the use of a GUI guided by a hyper-text markup language whereby a series of markup elements describe actions to be taken (including communications session addresses, etc.) upon selection of displayed screen objects. It will be understood by those of ordinary skill in the art that the use of such markup elements is merely exemplary of techniques for selecting an action based upon user input, and that any suitable substitute technique for requesting a change of communication session may be employed.

FIG. 4a is a flowchart showing actions to be taken by a data communications terminal (see e.g., 100, FIG. 1) in preparation for suspending a first communication session in preference of a second communications session. It is assumed that at the start of the process illustrated the flow chart of FIG. 4a that the first communications session is active. In a first step 402, the data communications terminal receives data from a service provider via the first communications session. In a second step 404 a next markup element is identified. This markup element indicates a graphic element to be displayed and/or actions to be taken upon a user selection. (Note that as described above, any other suitable selection technique may be employed) In a next step 406, it is determined whether the markup element identified in the previous step 404 includes an alternative network address (i.e., whether it is necessary to establish a second communications session with a different destination, such as another network, a telephone voice connection, a video connection, etc.). If an alternative network address is not indicated, then a next step 408 simply displays any graphical object(s) associated with the markup element and returns to the first step 402. If, however, an alternative network address is indicated, the alternative network address is retrieved and stored in a step 410. A next step 412 retrieves and stores information related to the cost of communications with the alternative network address (e.g., no cost in the case of an "800" telephone number, other connection charges and time-based charges in the case of other types of connections). A next step 414 retrieves and stores the type of alternative network address indicated by the markup element (e.g., data, voice, voice and data, video, etc..). A next step 416 retrieves display information associated with the alternative network address indicated by the markup element, such as image, text, video and/or audio data to be displayed or played. In a next step 418, display information associated with the markup element is displayed and/or played back, awaiting a selection by the user.

FIG. 4b is a flow chart of actions which are taken by the data communications terminal when the user selects an element (e.g., a displayed graphical object associated with a markup element). In a first step 420, a user selection is identified. That is, information related to a selection made by the user is identified. In the case of a hyper-text markup language, a markup element associated with a displayed object which has been selected by the user (e.g., by mouse click) is identified. In a next step 422, it is determined whether the selected element indicates an alternative voice (or video, or other) network. If not, a next step 424 determines whether the user selection is "valid", i.e., whether any action is associated with the selected element. If so, a next step 426 processes the user selection in "normal" fashion (i.e., change of display, retrieval of information via the current communication session, etc.) and returns to the first step 420 awaiting another selection by the user. If the selected element is not "valid", (i.e., no action is specified for the user selection) then the process simply returns to the first step 420, taking no action.

If the step 422 determines that the selected element does indicate an alternate network connection, a next step 428 stores the state of the current communications session (e.g., saves current network node and connection information, and any other information relevant to restoring the current communication session to its current state). A next step 430 retrieves the network address and access information (stored above in steps 410-414, FIG. 4a) associated with the alternate network connection. A next step 432 disconnects (closes) the current (first) communications session. A next step 434 places a call (attempts to initiate communication) to the alternate network address. A next step 436 determines whether the call is answered. If not, then the data communications session is restored according to the information saved in the step 428. If the call is answered, then a next step 438 determines if the call is a voice call (i.e., a call without a data component). If the call is not a "pure" voice call (e.g., a voice/data session, or other communications session with a data component) then a next step 440 begins handshaking to establish the data component of the alternate (second) communications session. Once the handshaking has been accomplished, then a next step 442 notifies the user that the connection has been established (e.g., by a screen message or by an audible tone or message) and enables the voice communications device (e.g., telephone, speakerphone, see, e.g., 160, FIG. 1). If it is determined in the step 438 that the access type is "voice" (no data component) then the step 440 is skipped.

FIG. 4c is a flow chart of actions which are taken by the data communications terminal when the second communications session is disconnected and the first communications session is resumed. In a first step 444, it is determined whether the second communications session has ended. If not, then a next step 446 determines whether a command (either user initiated or initiated remotely via the second communication session) to terminate the second communications session has been received. The steps 444 and 446 are repeated/until either the second communications session disconnects (444) or a command is received to terminate the second communication session. If the step 444 determines that the second communications session has become disconnected (e.g., the other end of the session hangs up their phone), then a next step 454 prompts the user to determine whether or not the user wishes to resume the first communications session. If, in a next step 456, it is determined that the user has elected not to resume the first communications session, then all communications activities are ended and the data communications terminal becomes idle.

If a command is received (step 446) to terminate the second session, then a next step 448, determines whether new session resumption instructions have been received. If so, a next step 450 resumes the first communication session (data connection) according to information stored in step 428 FIG. 4b. Once the first communications session is restored, a next step 452 applies the resumption instructions (e.g., retrieval of information via a connection to another address on the data communications network), and "normal" communications resumes (e.g., the state at entry to the flow chart of FIG. 4a).

In the event that no new session instructions are received (step 448) or in the event that the user elects to resume the first communications session after disconnection (step 456) then a next step 458 re-establishes the first communications connection and a next step 460 resumes the previous session (first communications session) based on the state information saved is step 428, FIG. 4b. After this "normal" communications processing (e.g., the state at entry to the flow chart of FIG. 4a) is resumed.

The system described in the aforementioned U.S. Pat. No. 5,319,701 differs from the present invention in that the present invention does not require interactivity between the data and voice sessions. Generally, once the voice session commences, the data session is discontinued (i.e., suspended). Moreover, at the conclusion of the voice session, the data session may be resumed.

The system described in the aforementioned U.S. Pat. No. 5,325,423 differs from the present invention in that the present invention does not require real-time interactivity, nor is it directed to multimedia (in the sense of voice and data being used simultaneously). Rather, according to the present invention, the data session is discontinued (i.e., suspended), as described hereinabove, when the voice session is established.

The system described in the aforementioned U.S. Pat. No. 5,351,296 differs from the present invention in that the present invention does not require simultaneous voice and data transmissions (sessions). The present invention provides a technique for switching from a data session to a voice session, then back to the data session.

The system described in the aforementioned U.S. Pat. No. 5,369,688 differs from the present invention in that the present invention is related to techniques for switching from data, to voice, back to data sessions.

Although the invention has been illustrated and described in detail in the drawings and foregoing description, the same is to be considered as illustrative and not restrictive in character—it being understood that only preferred embodiments have been shown and described, and that all changes and modifications that come within the spirit of the invention are desired to be protected.

What is claimed is:

1. A method of establishing voice and data connections using a communication terminal device, comprising:
   providing a communication terminal device, said communication terminal device including an input device and a display device;
   establishing a primary data connection between the communication terminal device and a data communication network;
   providing within the communication terminal device a service tag identifying a voice network address to which a voice connection can be established;
   providing, on the display device, a displayed service object associated with the service tag;
   selecting the service object with the input device;
   upon selection of the service object, employing a voice communication module to establish a voice connection to the voice network address, retaining context information related to the data connection, and suspending the primary data connection;
   in conjunction with establishing the voice connection establishing a secondary data connection between the communication terminal device and the data communication network; and
   upon completion of the voice communication using the voice connection, terminating the voice session and resuming the primary data connection.

2. A method, according to claim 1, wherein:
   the voice connection and the secondary data connection are both made to a service provider.

3. A method, according to claim 1, wherein:
   the voice connection and the secondary data connection are both accomplished using one physical network connection.

4. A method, according to claim 1, wherein:
   the voice connection and the secondary data connection are accomplished using more than one physical network connection.

5. A method, according to claim 2, wherein:
   data communication via the secondary data connection is remotely guided by the service provider.

6. A method, according to claim 1, further comprising:
   receiving network navigational information via the secondary data communication connection.

7. A method, according to claim 1, wherein:
   data communication via the secondary data connection is remotely guided.

8. A method, according to claim 1, further comprising:
   receiving, via the secondary data connection, a resumption network address.

9. A method, according to claim 8, further comprising:
   establishing a data connection to the resumption network address upon resumption of the primary data connection.

10. A method, according to claim 1, further comprising:
    providing a video module for establishing a video connection with a video communication network; and
    employing the video module to establish a video connection in conjunction with the voice connection.

11. A method, according to claim 1, further comprising:
    providing a video module for establishing a video connection with a video communication network; and
    employing the video module to establish a video connection in conjunction with the voice connection.

12. A method, according to claim 11, wherein:
    the service tag further identifies a video network address, to which the video connection is established.

13. A method, according to claim 11, wherein:
    the voice connection, video connection, and secondary data connection are all accomplished using one physical network connection.

14. A method, according to claim 11, wherein:
    the voice connection, video connection, and secondary data connection are accomplished using more than one physical network connection.

15. A method of establishing a voice and data connections using a communication terminal device, comprising:
    providing a communication terminal device, said communication terminal device including an input device and a display device;
    establishing a primary connection between the communication terminal device and a data communication network;
    providing within the communication terminal device a service tag identifying a voice network address to which a voice connection can be established;
    providing, on the display device, a displayed service object associated with the service tag;
    selecting the service object with the input device;
    upon selection of the service object, employing a voice communication module to establish a voice connection to the voice network address, retaining context information related to the data connection, and suspending the primary data connection; and
    determining, based upon information stored with the service tag, physical capabilities of the communication terminal device and physical network connections to the communication terminal device, whether simultaneous voice and data communication is possible;
    establishing a secondary data connection to a data network address identified by the service tag if it is determined that simultaneous voice and data communication is possible;
    upon completion of the voice communication using the voice connection, terminating the voice session, terminating the secondary data connection if one has been established, and resuming the primary data connection.

16. A method, according to claim 15, wherein:

the voice connection and the secondary data connection are both made to a service provider.

17. A method, according to claim 15, wherein:

the voice connection and the secondary data connection are both accomplished using one physical network connection.

18. A method, according to claim 15, wherein:

the voice connection and the secondary data connection are accomplished using more than one physical network connection.

19. A method, according to claim 15, further comprising:

receiving network navigational information via that secondary data communication connection.

20. A method, according to claim 15, wherein:

data communication via the secondary data connection is remotely guided.

21. A method, according to claim 15, further comprising:

receiving, via the secondary data connection, a resumption network address.

22. A method, according to claim 21, further comprising:

establishing a data connection to the resumption network address upon resumption of the primary data connection.

* * * * *